(12) United States Patent  
Brazell

(10) Patent No.: US 6,478,664 B2  
(45) Date of Patent: Nov. 12, 2002

(54) CUT-OFF SAW

(75) Inventor: Kenneth M. Brazell, Piedmont, SC (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/804,659

(22) Filed: Mar. 12, 2001

(65) Prior Publication Data

US 2002/0127960 A1 Sep. 12, 2002

(51) Int. Cl.[7] .................................................. B24B 7/00
(52) U.S. Cl. ..................... 451/280; 451/360; 83/490; 125/13.01
(58) Field of Search ........................... 451/280, 11, 358, 451/359, 411, 360, 344, 236, 342; 125/13.01, 13.03, 35; 83/471.1, 471.2, 471.3, 478, 490, 397, DIG. 1

(56) References Cited

U.S. PATENT DOCUMENTS

| | | | |
|---|---|---|---|
| 3,994,192 A | * 11/1976 | Faig | 83/490 |
| 4,011,782 A | * 3/1977 | Clark et al. | 83/490 |
| 4,343,213 A | 8/1982 | Drixler | |
| 4,452,117 A | 6/1984 | Brickner et al. | |
| 4,581,966 A | 4/1986 | Kaiser et al. | |
| 4,774,866 A | * 10/1988 | Dehari et al. | 83/490 |
| 4,934,233 A | 6/1990 | Brundage et al. | |
| 4,974,306 A | 12/1990 | Cole et al. | |
| 5,054,352 A | 10/1991 | Fushiya et al. | |
| 5,161,443 A | 11/1992 | Huang | |
| 5,181,448 A | 1/1993 | Terpstra | |
| 5,370,025 A | 12/1994 | Itzov | |
| 5,483,858 A | 1/1996 | Chen | |
| 5,638,731 A | 6/1997 | Garuglieri | |
| 5,720,096 A | 2/1998 | Dorsey | |
| 5,752,421 A | 5/1998 | Chang | |
| 5,787,779 A | 8/1998 | Garuglieri | |
| 5,960,691 A | * 10/1999 | Garuglieri | 83/490 |
| 6,182,548 B1 | * 2/2001 | Meredith et al. | 83/490 |

\* cited by examiner

Primary Examiner—Eileen P. Morgan  
Assistant Examiner—Hadi Shakeri  
(74) Attorney, Agent, or Firm—Brooks & Kushman P.C.

(57) ABSTRACT

A pivoting arm cut-off saw is provided having a base, a cutting arm assembly and a lock bar. Cutting arm assembly is pivotally attached to the base and shiftable between a raised and lowered position. A lock bar interposed between the base and the cutting arm is slidably moveable between an unlock position where cutting arm assembly is free to pivot and a locked position in which a locking portion of a lock bar is interposed between a fixed stop on the base and a rotating stop on the cutting arm. The lock bar is provided with a grip portion to be grasped by the user enabling the lock bar to be moved between a pair of limit stops.

20 Claims, 3 Drawing Sheets

CUT-OFF SAW

TECHNICAL FIELD

The present invention relates to a pivoting arm cut-off saw having a mechanism to retain the cutting arm assembly in a lowered position during storage and transport.

BACKGROUND ART

Pivoting arm cut-off saws are produced in a variety of different types and configurations. Pivoting arm cut-off saws intended to cut metal are frequently referred to as chop saws or abrasive cut-out saws, and are provided with a rotary abrasive wheel mounted on a pivoting arm for plunging into and out of a workpiece supported on a base. Typically, cut-off saws intended for metal use have a fixed pivot axis and a rotary fence enabling the workpiece to be positioned relative to the cutting plane to achieve a miter cut. Pivoting arm cut saws intended for woodworking come in a variety of configurations. Low price wood saws typically resemble abrasive cut-off saws for metal, except that a saw blade is substituted for the abrasive disc. The more expensive wood cut-off saws are provided with a miter adjustment enabling the pivot arm to be rotated about a vertical axis. Another configuration of a woodworking pivoting arm cut-off saw is referred to as a compound miter saw in which the pivot arm can be rotated to vary the miter angle, as well as being tilted about a horizontal axis to vary the tilt of the cutting blade, in order to achieve a compound miter cut. A sliding compound miter saw includes both miter and tilt adjustments, like a compound miter saw, while also having an elongate track enabling the saw blade and motor assembly to be moved horizontally when the blade is in the lowered position in order to cut relatively wide workpieces.

A common feature to all of the pivoting arm cut-off saws is that the cutting disc is mounted on an elongate cutting arm assembly, which is pivotably attached at one end to the base and is provided with a handle to allow the user to plunge the rotating cutting disc into the workpiece supported on the top surface of the base. A spring mechanism is typically provided to bias the pivoting arm assembly in the raised position.

When not in use it is desirable to lower the pivot arm so that the cutoff saw is more compact and easier to transport. A simple link chain and hook is a common way to hold the cutting arm assembly in the lowered position against the spring biasing force. The arm is simply moved to the lowered position and the chain is placed between the end of the arm and the base preventing the arm from rising. Although effective, this technique for maintaining the arm in the lower position is of poor aesthetic appearance and can be unreliable.

Various other techniques have been developed for maintaining the cutting arm in the lowered position during transport, such as a removable pin or a lock screw cooperating with a threaded bore. Particularly when used in metal cut-off saws, lock mechanisms, which require closely toleranced parts, such as screws and threaded bores are not effective because of the binding problems caused by metal cutting sand abrasive grit. Accordingly, it is the goal of the present invention to provide a simple low cost cutting arm assembly lock mechanism for maintaining the arm in the lowered position when the saw is not in use, which is strong, reliable and simple to operate, even when used in harsh abrasive environments.

DISCLOSURE OF INVENTION

The pivoting arm cut-off saw of the present invention is made up of three basic components, a base, a cutting arm assembly and a locking bar. The base has a top surface for supporting a workpiece and a through-slot defined in the top surface. The cutting arm assembly has a proximate end pivotally attached to the base and a distal end spaced therefrom terminating in a handle. The cutting assembly is disposed between the proximate and distal ends of the arm assembly and includes a motor and a rotatingly driven cutting disc. Pivotal movement of the cutting arm by the operator causes the rotating cutting disc to move toward the base and extend through the through slot in order to sever a workpiece supported on the top surface of the base. The locking bar temporarily locks the cutting arm in the lowered position when the cut-off saw is not in use. The locking bar is removable between a locked and unlocked position. The locking arm has a grip portion to be grasped by the user and a locking portion which, when the locking bar is moved to the locked position, is interposed between a pair of stop surfaces, one on the base and one on the cutting arm, to prevent the cutting arm from rotating to the raised position. When the locking bar is moved to the unlocked position the locking portion retracts sufficiently to enable the cutting arm assembly to rotate freely relative to the base.

BEST MODE FOR CARRYING OUT THE INVENTION

Figure 1:
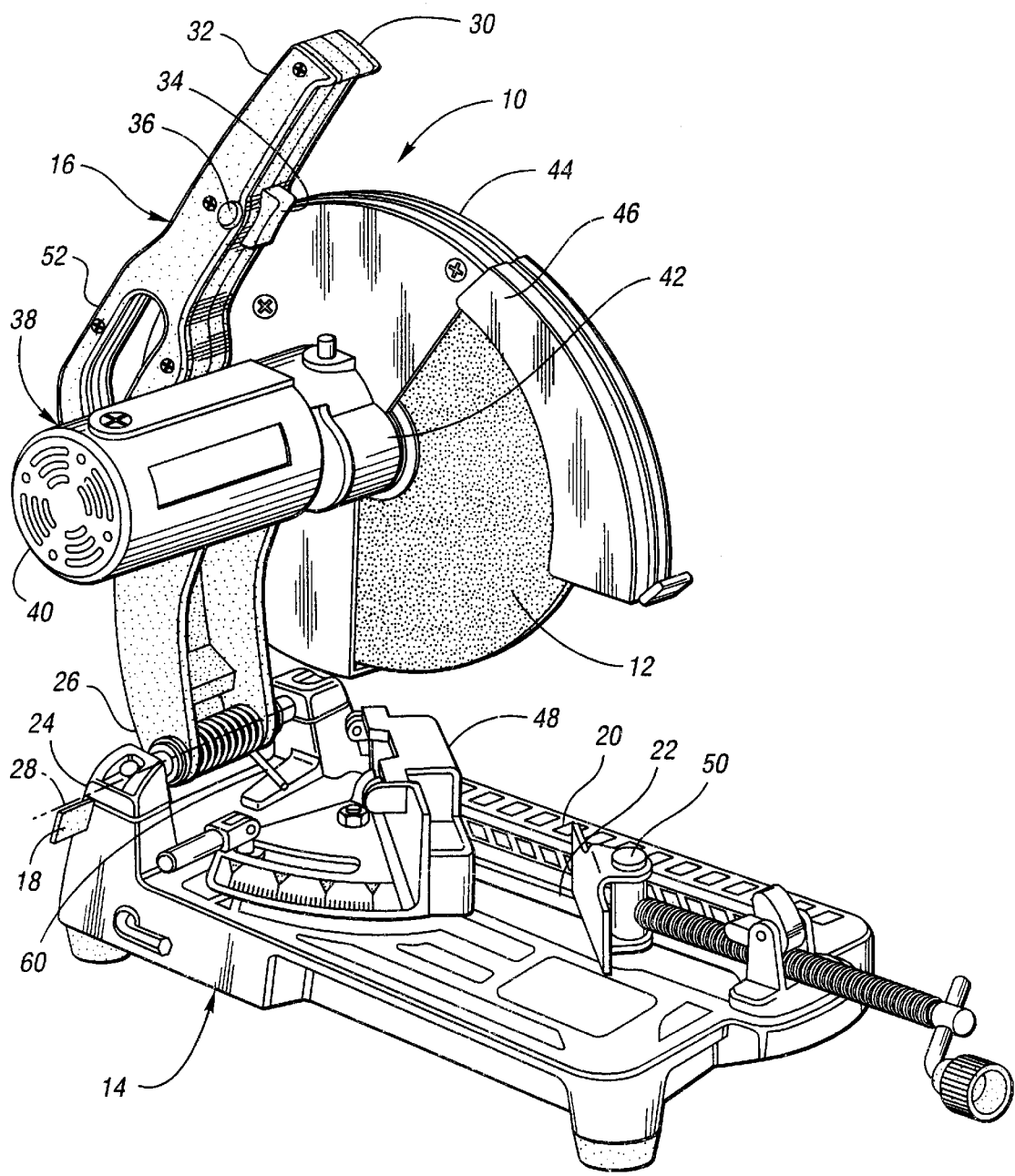
FIG. 1 is a perspective view of a pivoting arm cut-off saw of the present invention with the cutting arm assembly in the raised position.

Cut-off saw 10 illustrated in FIG. 1 is one of the many types of pivoting arm cut-off saws that can be utilized with the present invention. The illustrated cut-off saw 10 is designed for cutting metal and utilizes an abrasive rotating cutting disc 12 for cutting metal workpieces (not shown). The present invention is likewise suitable for use with a variety of other pivoting arm cut-off saws such as miter, compound miter, and sliding compound miter saws used in woodworking. In woodworking applications, abrasive rotary cutting disc 12 would not be used, rather a conventional circular saw blade would provide the cutting disc.

Cut-off saw 10 illustrated for the purpose of describing the present invention has three main components, a base 14, a cutting arm assembly 16 and a lock bar 18. The base 14 has a top surface 20 for supporting a workpiece. The base 14 is also provided with a through-slot 22 which extends through the top surface 20. A pivot attachment member 24 is oriented rearward of the top surface 20. Cutting arm 16 is provided with a proximate end 26 pivotally connected to pivot attachment member 24 to enable the cutting arm assembly 16 to rotate relative to base 14 about a pivot axis 28. Cutting arm assembly 16 s provided with a distal end 30 which forms an operating handle 32 to be grasped by a user (not shown). A conventional trigger switch 34 and a trigger switch lock bar 36 are provided on the handle adjacent the user's forefinger and thumb in a typical manner. Intermediate proximate end 26 and distal end 30 of cutting arm 16 is cutting assembly 38 which includes a motor 40, the rotary cutting disc 12 driven by the motor 40 in a conventional manner, a transmission 42 and stationary and moveable guards 44 and 46 of conventional design.

Figure 2:
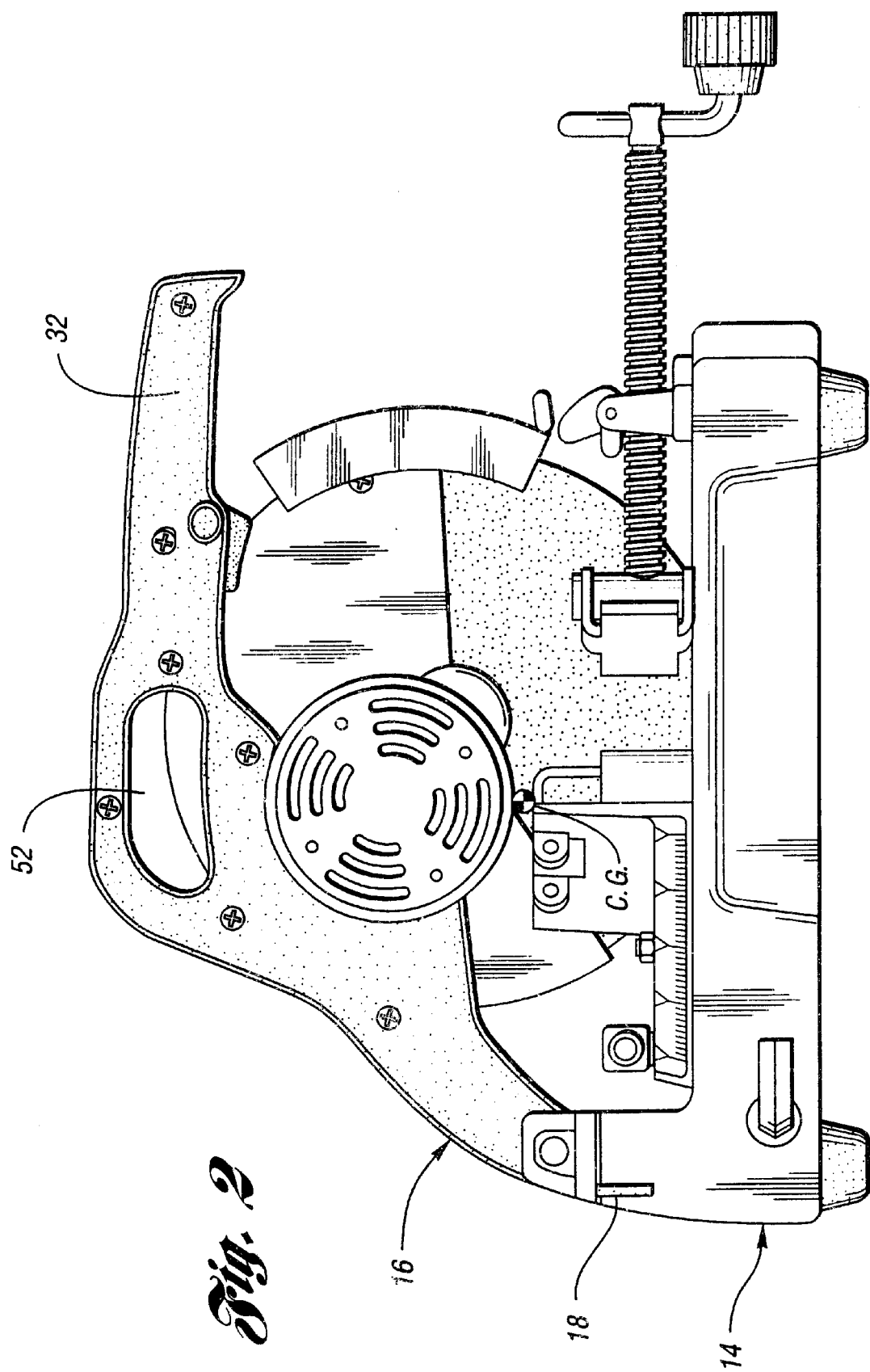
FIG. 2 is a side view of the cut-off saw in FIG. 1 with the cutting arm in the lowered locked orientation.

The cutting arm assembly 16 is pivotable and moveable between a raised position shown in FIG. 1 and a lowered position shown in FIG. 2. In operation, the user would place a workpiece on top surface 20 of base 14. The workpiece would be positioned against a fence 48 and, if desired, a clamp 50 may also be used to securely retained the workpiece against the fence 48 in a conventional manner. When the workpiece is properly oriented and constrained, motor 40 will be turned on causing cutting disc 12 to rotate, whereupon the user will grasp the handle 32 and slowly advance the rotating cutting disc 12 into the workpiece and ultimately into through-slot 22 until the workpiece is severed.

When the saw 10 is not in use it is desired to lock the cutting arm assembly 16 into the lowered position illustrated in FIG. 2. Locking the cutting arm 16 makes it a lot easier to transport the saw and protects the cutting disc 12 from damage. For ease of transportation cutting arm assembly 16 is provided with carrying handle 52, located above center of gravity of the saw 10 when the arm 16 is in the lowered position. Lock bar 18 is provided to temporarily lock the cutting arm assembly in the lowered position. Lock bar 18 cooperates with the base 14 and the cutting arm 16, and is slidably shiftable between a locked position shown in FIG. 3 and an unlocked position shown in FIG. 4. In the preferred embodiment lock bar 18 is elongated in shape having a locking portion 54 at one end, a grip portion 56 at the opposite end, and a central portion 58 extending therebetween. Grip portion 56 is sufficiently long to be grasped by the user in both the locked and unlocked position. The user will pull the lock bar 18 out to the unlocked position shown in FIG. 4 to release the cutting arm assembly when the saw is being used. When the saw is not being used the user can lower cutting arm assembly 16 by compressing spring 60, which otherwise urges cutting arm assembly 16 to a normal raised position shown in FIG. 1. When the cutting arm assembly is in the fully lowered position, the user can shift lock bar 18 inwardly to the locked position shown in FIG. 3. In the locked position, lock bar 18 is supported on one side by fixed stop 62 on the base 14 and on a rotating stop 64 of cutting arm assembly 16. Rotating stop 64 is formed on the proximate end 26 of cutting arm assembly 16 and is adjacent to and spaced from pivot axis 28. Similarly, fixed stop 62 is located on base 14 and is spaced from and adjacent to pivot axis 28.

Figure 3:
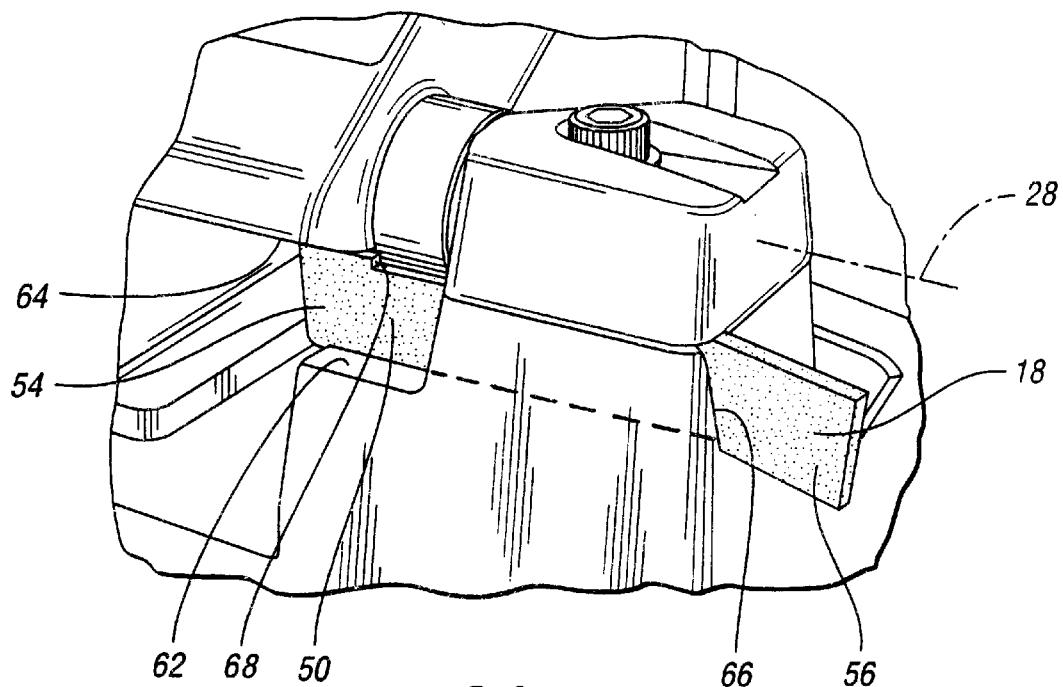
FIG. 3 is an enlarged view showing the orientation of the lock bar, the base and the cutting arm assembly with the cutting arm in the locked position.
Figure 4:
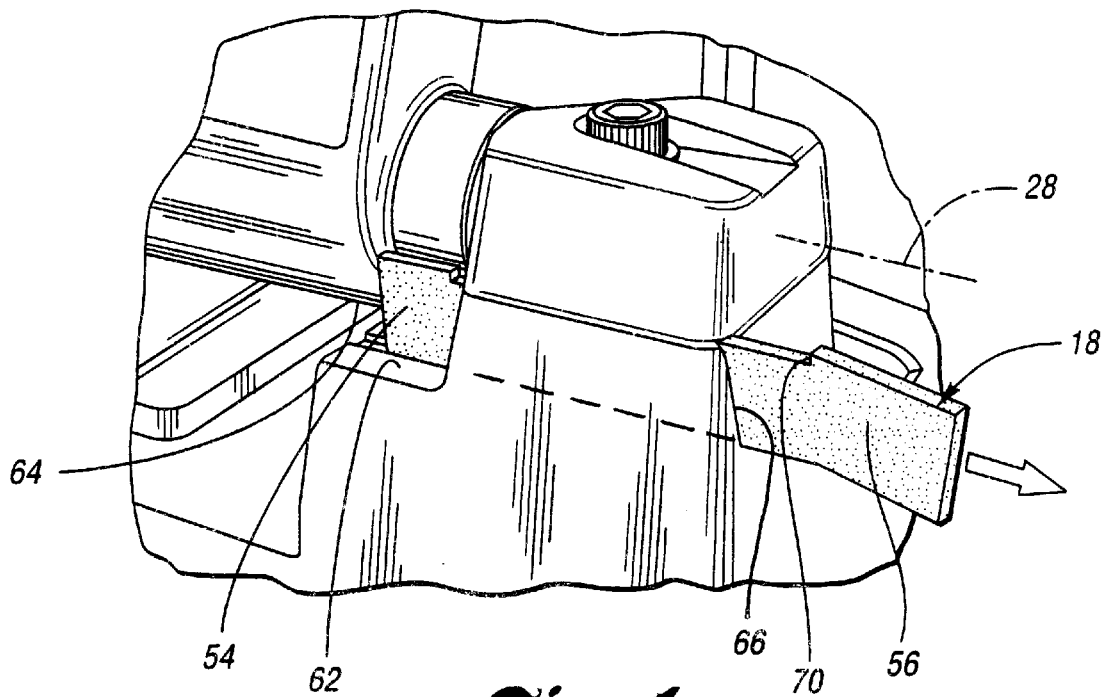
FIG. 4 is an enlarged view of the lock bar base and cutting arm assembly in the unlocked position.

In the preferred embodiment illustrated in FIG. 4, lock bar 18 slides within an elongate aperture 66, which is formed in the base 14. Elongate aperture 66 and lock bar 18 are generally rectangular in cross section. The lock bar 18 is further provided with a pair of limit stops 68 and 70 to limit the travel of lock bar 18, relative to elongate aperture 66 in the base 14. Preferably lock bar 18 is formed of a generally planar steel plate, which is rectangular in cross section and loaded on edge, as illustrated in FIGS. 3 and 4 to maximize lock bar 18 rigidity. The end of lock bar 18 forming the locking portion end 54 cantileverly extends from base 14 to engage rotating stop 64 on cutting arm 16 as illustrated in FIG. 3. It is necessary to space the lock bar 18 sufficiently from pivoting axis 28, so that lock bar 18 is affixed on fixed stop 62 and rotating stop 64 and not excessively loaded. When the user lifts up saw assembly 10 by carrying handle 52, the locking portion 54 of lock bar 18 is loaded in shear between rotating stop 64 and fixed stop 62, thus overcoming the corresponding rotational moment caused by the weight of base 14.

While lock bar 18 is shown oriented rearward of pivot axis 28, the lock bar 18 could be alternatively located in a different position provided that it is spaced sufficiently from pivot axis 28 and is capable of engaging appropriately located stops on base 14 and cutting arm assembly 16. Additionally the lock bar could alternatively be designed to pivotally mount on the cutting arm assembly 16 and rotate into and out of engagement with the base.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pivoting arm cut-off saw comprising:
    a base having a top surface for supporting a workpiece, a through-slot defined in the top surface, a pivot attachment member oriented rearward of the top surface, and a fixed stop adjacent the pivot attachment member;
    a cutting arm assembly having a proximate end pivotally connected to the pivot attachment member to facilitate relative rotation therebetween about a pivot axis, a rotating stop formed on the proximate end adjacent to and spaced from the pivot axis, a distal end terminating in a handle, and a cutting assembly disposed between the proximate and distal ends including a motor and a rotary cutting disc operatively driven by the motor, wherein the cutting arm assembly is pivotally movable between a raised position where the cutting disc is above the base top surface and a lowered position forward of the pivot attachment member wherein the cutting disc extends into the through-slot; and
    a lock bar cooperating with the base and the cutting arm, slidably movable between an unlocked position and a locked position, the lock bar including a locking portion, and a grip portion to be grasped by a user, wherein the locking portion is interposed between and engages both the fixed and rotating stops to maintain the cutting arm assembly in the lower position when the lock bar is shifted to the locked position, and facilitates limited free movement of the cutting arm assembly relative to the base when the lock bar is shifted to the unlocked position.

2. The cut-off saw of claim 1 wherein the lock bar is provided with a pair of limit stops which limit the travel of the lock bar.

3. The cut-off saw of claim 1 when the lock bar extends through an elongate aperture formed in one of the base and the cutting arm assembly to slidably move between the unlock position and the lock position along a lock bar axis which is generally parallel to the pivot axis.

4. The cut-off saw of claim 3 wherein the elongate aperture is formed in the base.

5. The cut-off saw of claim 4 wherein the elongate aperture is generally rectangular in cross section and the lock bar has a corresponding rectangular shape.

6. The cut-off saw of claim 5 wherein the lock bar is formed of a generally planar steel plate.

7. The cut-off saw of claim 6 wherein the lock bar is loaded on edge between the fixed and rotating stops to maximize lock bar stiffness.

8. The cut-off saw of claim 4 wherein the locking portion of the lock bar cantileverly extends from the elongate aperture when in the locking position to engage the rotary stop.

9. The cut-off saw of claim 8 wherein the lock bar grip portion extends from an end of the elongate aperture a distance sufficient to be grasped by the user in either the locked or unlocked lock bar position.

10. The cut-off saw of claim 1 further comprising a fence assembly releasably affixable to the top surface of the base at various angular orientations relative to the through-slot.

11. The cut-off saw of claim 1 wherein the cutting disc comprises an abrasive wheel capable of cutting metal.

12. A metal cut-off saw comprising:
   a base having a top surface for supporting a metal workpiece, a through-slot defined in the top surface, a pivot attachment member oriented rearward of the top surface, and a fixed stop adjacent the pivot attachment member;
   a cutting arm assembly having a proximate end pivotally connected to the pivot attachment member to facilitate relative rotation therebetween about a pivot axis, a rotating stop formed on the proximate end adjacent to and spaced from the pivot axis, a distal end terminating in a handle, and a cutting assembly disposed between the proximate and distal ends including a motor and a rotary abrasive cutting disc operatively driven by the motor, wherein the cutting arm assembly is pivotally movable between a raised position where the abrasive cutting disc is above the base top surface and a lowered position forward of the pivot attachment member wherein the abrasive cutting disc extends into the through-slot; and
   a lock bar cooperating with the base and the cutting arm, slidably movable between an unlocked position and a locked position, the lock bar including a locking portion, and a grip portion to be grasped by a user, wherein the locking portion is interposed between and engages both the fixed and rotating stops to maintain the cutting arm assembly in the lower position when the lock bar is shifted to the locked position, and facilitates limited free movement of the cutting arm assembly relative to the base when the lock bar is shifted to the unlocked position.

13. The cut-off saw of claim 12 wherein the lock bar is provided with a pair of limit stops which limit the travel of the lock bar.

14. The cut-off saw of claim 12 when the lock bar extends through an elongate aperture formed in one of the base and the cutting arm assembly to slidably move between the unlock position and the lock position along a lock bar axis which is generally parallel to the pivot axis.

15. The cut-off saw of claim 14 where the elongate aperture is formed in the base.

16. The cut-off saw of claim 15 wherein the elongate aperture is generally rectangular in cross section and the lock bar has a corresponding rectangular shape.

17. The cut-off saw of claim 16 wherein the lock bar is formed of a generally planar steel plate.

18. The cut-off saw of claim 17 wherein the lock bar is loaded on edge between the fixed and rotating stops to maximize lock bar stiffness.

19. The cut-off saw of claim 15 wherein the locking portion of the lock bar cantileverly extends from the elongate aperture when in the locking position to engage the rotary stop.

20. The cut-off saw of claim 19 wherein the lock bar grip portion extends from an end of the elongate aperture a distance sufficient to be grasped by the user in either in the locked or unlocked lock bar position.

* * * * *